No. 654,903. Patented July 31, 1900.
A. LOOMIS.
POWER TRANSMISSION.
(Application filed Sept. 29, 1899.)
(No Model.)

WITNESSES
A. D. Harrison
P. W. Pezzetti

INVENTOR
Allen Loomis.

THE NORRIS PETERS CO., PHOTO-LITHO., WASHINGTON, D. C.

UNITED STATES PATENT OFFICE.

ALLEN LOOMIS, OF JACKSON, MICHIGAN.

POWER TRANSMISSION.

SPECIFICATION forming part of Letters Patent No. 654,903, dated July 31, 1900.

Application filed September 29, 1899. Serial No. 732,061. (No model.)

*To all whom it may concern:*

Be it known that I, ALLEN LOOMIS, of Jackson, in the county of Jackson and State of Michigan, have invented certain new and useful Improvements in Power Transmissions, of which the following is a specification.

My invention relates to improvements in power transmissions in which power is transmitted from the cranks of a reciprocating engine to two rotating parts so driven that a varying ratio of their speeds may be automatically compensated for.

Figure 1:
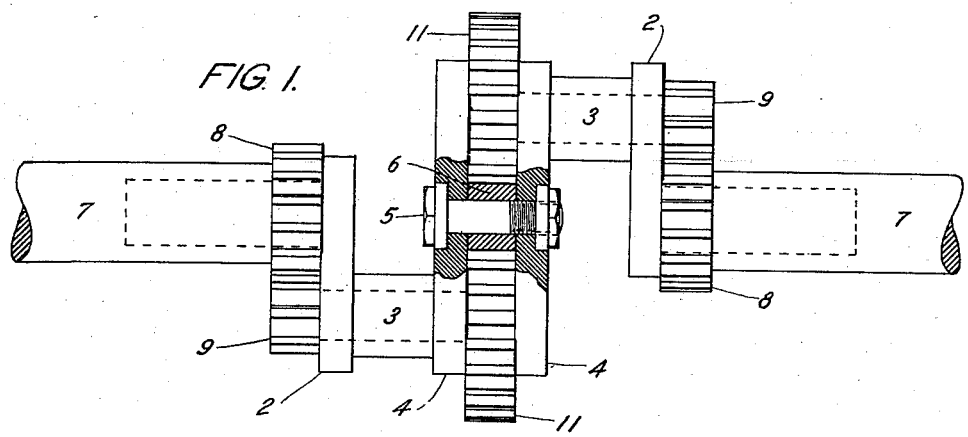
Figure 2:
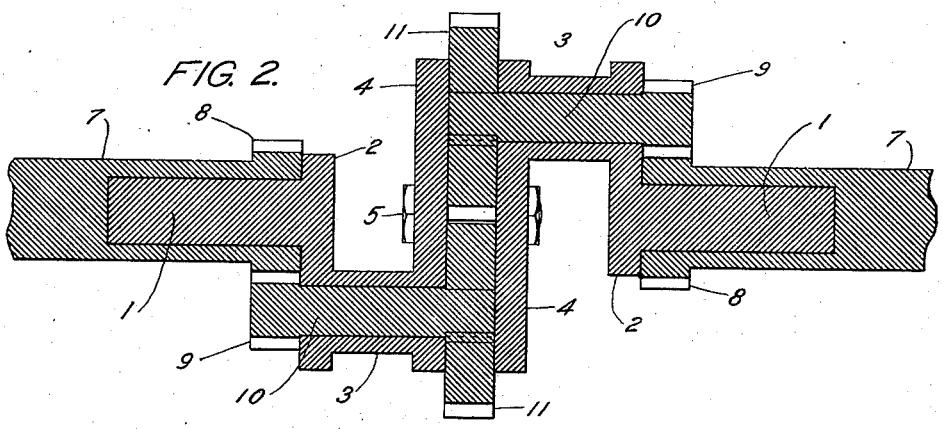
Figure 3:
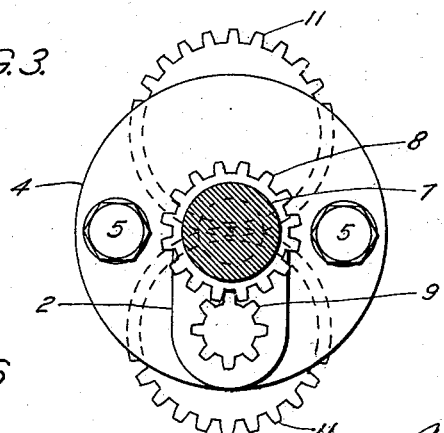

In the drawings, Figures 1, 2, and 3 present various views of a preferred form of the mechanism. Fig. 1 is a view normal to the plane of the two crank-pins. Fig. 2 is a section through the centers of the shaft and crank-pins. Fig. 3 is an end view.

Throughout all figures similar numerals refer to similar parts.

In the drawings the parts 1 1 are journals, 2 2 are cranks, 3 3 are hollow crank-pins, and 4 4 are crank-disks. The two parts, each of which consists of one each of the above-mentioned elements, are further united, as subsequently described, and held firmly together at a proper distance by the two bolts 5 5 and the distance-pieces 6 6. Of the latter one only is shown—namely, in Fig. 1. 7 7 are the two portions of the divided shaft. Each has bored in its inner end a hole which serves as a bearing for one of the journals 1 1. Upon the inner ends of the shaft-sections 7 7 are two spur-gears 8 8, each of which meshes with one of the spur-gears 9 9. 9 9 are each integral with one of the short shafts or spindles 10 10, each of which passes through one of the hollow crank-pins, which serve as bearings. The spur-gears 11 11 are then keyed upon the shafts 10 10. Finally the crank-disks 4 4 are united by the bolts 5 5 and distance-pieces 6 6 in such a manner that the spur-gears 11 11 mesh properly with each other. When the portions of the divided shaft are constrained to turn with equal angular velocities, as in the case of the wheels of a vehicle when the vehicle is moving in a straight line, the parts shown all remain in fixed relation to each other, rotating as a solid piece about the common axis of the shaft-sections. When, however, the shaft-sections are constrained to rotate with unequal angular velocities, as when the vehicle is turning a curve, the solid cranked portion revolves about the axis of the divided shaft with an angular velocity which is the mean of the angular velocities of the divided portions. Compensation is automatically effected, as in the usual differential gear, by the rotation relative to the cranked portion, the constituent parts of which are numbered 1 to 6, inclusive, of the parts numbered 7 to 11, inclusive, which are in Fig. 2 cross-hatched in a direction contrary to that in which are cross-hatched the constituent parts of the cranked portion. The criterion of proper action is that when the cranks are at rest and one of the portions of the divided shaft is made to rotate the other portion shall rotate in the opposite direction with an equal angular velocity.

What I claim as my invention, and wish to secure by Letters Patent, is—

1. Mechanism for the transmission of power, consisting of a divided shaft each portion of which is driven; an intermediate driving portion having a plurality of crank-pins and having with the divided shaft a common axis of rotation; and a train of gear-wheels having substantially-cylindrical pitch-surfaces, two of said gear-wheels being fixedly mounted upon the portions of the divided shaft, the remainder turning about bearings carried by the driving portion, said train of gears automatically compensating for a difference of angular velocities of said driven portions.

2. Mechanism for the transmission of power, consisting of a divided shaft each portion of which is driven, an intermediate cranked driving portion loosely mounted between the inner ends of the divided shaft, said cranked portion comprising two hollow crank-pins, means at their outer ends for mounting said cranked portion so that it may revolve about the same axis of rotation as the divided shaft, means at their inner ends for fastening them together, and bearings for a train of gears; said train of gears consisting of toothed wheels having substantially-cylindrical pitch-surfaces, two of said toothed wheels being fixedly mounted upon the portions of the divided shaft, and the remainder turning in bearings in the driving portion, said train of gears being in motion relative to the driving portion, when the driven portions are revolving with unequal angular velocities, automatically compensating for the differential motion.

3. Mechanism for the transmission of power, consisting of the following parts, namely: first, a divided shaft, each portion of which has fixedly mounted near its inner end one part of a bearing; second, an intermediate cranked portion mounted upon the complementary parts of said bearings and freely turning thereon, said cranked portion comprising two hollow crank-pins, means for fixing them at their outer ends to said parts of bearings, and means for fastening them together at their inner ends; third, a train of compensating gears for permitting a differential motion of the parts of said divided shaft, said train of gears consisting of the following-named elements: two spur-gears meshing with each other, fixedly mounted upon the inner ends of two spindles which rotate freely within the crank-pins; fixedly mounted upon the outer ends of said spindles two other spur-gears; and, fixedly mounted at approximately the inner ends of the portions of the divided shaft, two additional spur-gears, each one of which meshes with one of the last-mentioned spur-gears.

4. In a compensating driving mechanism, the combination of the shaft-sections, the crank-pins independent of said sections but adapted to be rotated about the prolonged axes of said shaft-sections, said crank-pins being rigidly connected together; the small shafts revoluble in said crank-pins; the gears fixed upon the ends of said small shafts, one gear of one shaft meshing with the corresponding gear of the other shaft; and the gears fixed upon said shaft-sections and meshing with the other of said gears on said small shafts, substantially as set forth.

5. In a compensating driving mechanism, the combination with two shaft-sections terminally separated but supported in alinement; of the two cranks located between the neighboring ends of said shaft-sections and independent thereof but adapted to be revolved about the common axial line thereof, said cranks being rigidly connected; and mechanism carried by said cranks and engaging said shaft-sections for enabling said cranks to forcibly rotate said shaft-sections while permitting relatively-unequal rotation of said shaft-sections, substantially as set forth.

In testimony whereof I have affixed my signature in presence of two witnesses.

ALLEN LOOMIS.

Witnesses:
C. F. BROWN,
A. D. HARRISON.